United States Patent [19]

Russell

[11] 4,068,283

[45] Jan. 10, 1978

[54] CIRCUIT BREAKER SOLID STATE TRIP UNIT INCORPORATING TRIP INDICATING CIRCUIT

[75] Inventor: Ronald R. Russell, Plainville, Conn.

[73] Assignee: General Electric Company, New York, N.Y.

[21] Appl. No.: 728,616

[22] Filed: Oct. 1, 1976

[51] Int. Cl.² ............................................. H02H 7/00
[52] U.S. Cl. ..................................... 361/205; 361/96; 361/156; 361/193
[58] Field of Search ................ 361/96, 156, 191, 193, 361/205; 340/253 R, 253 A, 253 H

[56] References Cited

U.S. PATENT DOCUMENTS

| | | | |
|---|---|---|---|
| 3,447,041 | 5/1969 | Sandstrom | 361/205 X |
| 3,573,556 | 4/1969 | Zocholl | 361/102 |
| 3,599,045 | 8/1971 | Farinas | 361/98 |
| 3,683,362 | 8/1972 | Schwanenflugel | 340/253 A X |
| 3,975,666 | 8/1976 | Redding | 361/156 |
| 4,004,201 | 1/1977 | De Puy | 361/96 |

Primary Examiner—Harry E. Moose, Jr.
Attorney, Agent, or Firm—Robert A. Cahill; Walter C. Bernkopf; Frank L. Neuhauser

[57] ABSTRACT

A separate electronic switch controls energization of each of a plurality of parallel connected electromagnetic targets. An additional electronic switch controls energization of a circuit breaker trip solenoid. The individual trigger circuits for each target switch are common with the trigger circuit for the trip solenoid switch, such that a trigger signal to any one of the target switches is also applied to the solenoid switch to achieve concurrent, but independent energization of the associated target and the trip solenoid.

1 Claim, 1 Drawing Figure

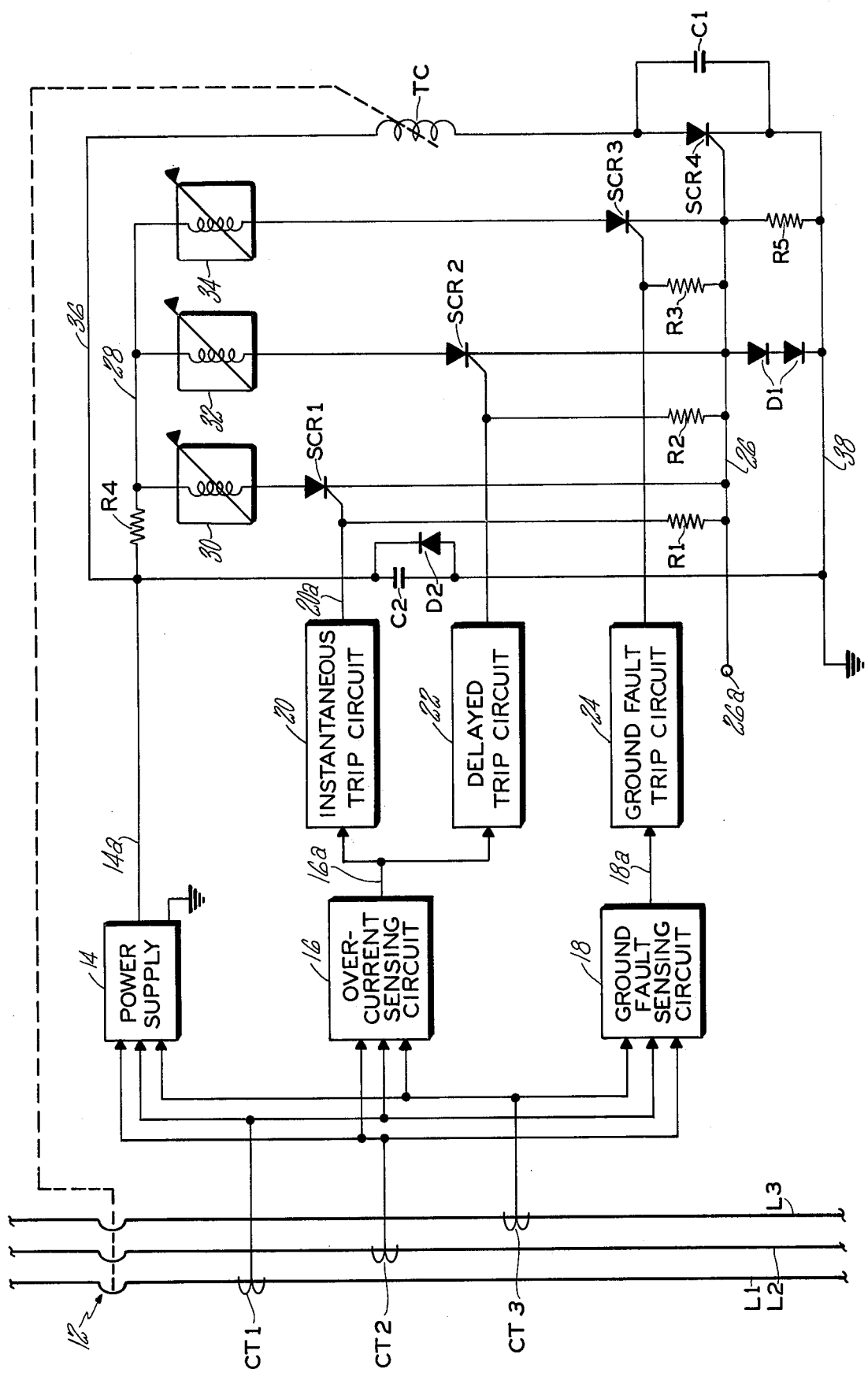

CIRCUIT BREAKER SOLID STATE TRIP UNIT INCORPORATING TRIP INDICATING CIRCUIT

BACKGROUND OF THE INVENTION

The present invention relates to circuit protective devices, and particularly to automatic electric circuit breakers which are equipped with electronic or solid state trip units having the capability of initiating circuit interruption in response to any one of a plurality of abnormal circuit conditions, such as, for example, overload, short circuit and ground fault.

Inasmuch as current solid state circuit breaker trip units have this capability of responding to a variety of abnormal circuit conditions, it would be most beneficial to know, from a troubleshooting standpoint, which abnormality was responsible for tripping the circuit breaker and interrupting the circuit. That is, a positive indication of which circuit abnormality was present can greatly simplify the search for the problem source, enabling corrective measures to be taken all the sooner. Particularly in the case of industrial applications, a loss of electrical service typically means the curtailment or complete halt on a production operation. Thus, it is highly desirable that a power outage, when it does occur, be rectified in as little time as possible.

It is accordingly an object of the present invention to provide an improved multi-function solid state trip unit for automatic electric circuit breakers.

An additional object of the present invention is to provide a static trip unit of the above character, which includes means for indicating which of the trip unit functions was responsible for tripping the circuit breaker.

Still another object is to provide a solid state trip unit of the above character, wherein the indicating means is operated off the trip unit power supply.

A further object is to provide a trip unit of the above character, wherein tripping of the circuit breaker cannot be prejudiced by a failure of the indicating means.

Other objects of the invention will in part be obvious and in part appear hereinafter.

SUMMARY OF THE INVENTION

In accordance with the present invention, there is provided a multi-function solid state trip unit for automatic electric circuit breakers, wherein the trip unit includes a plurality of indicating or target means for signalling which of the multiple trip functions was operative in tripping the circuit breaker to interrupt the distribution of circuit being protected. To this end, the trip unit includes means for sensing the magnitude of the current in each line conductor of an electrical power distribution circuit to detect the existence of overcurrent and ground fault conditions. Upon the detection of an overcurrent condition, the trip unit undertakes appropriate action in accordance with the severity of the condition. If the current in any line conductor is found to be of short circuit proportions, the trip unit includes an instantaneous trip circuit which undertakes to initiate a trip function without delay by triggering an electronic switch to complete an energization circuit for a trip coil acting to unlatch the circuit breaker operating mechanism such that it can act forthwith to open the breaker contacts.

When the magnitude of the line current or currents is found to be in excess of rated current but less than short circuit proportions, thus indicating an overload condition, the trip unit includes another trip circuit undertaking to initiate a trip function by enabling energization of the trip coil upon the expiration of a time delay typically determined on an inverse time basis. That is, the duration of the delay established by the delayed trip circuit is inversely proportional to the severity of the overload condition. Thus, as the overload current magnitude increases, the time delay decreases, and vice versa.

Upon the detection of a ground fault, the trip unit includes a ground fault trip circuit undertaking to initiate a ground fault trip function by enabling energization of the trip coil to likewise trip the circuit breaker.

To signify which of the various trip functions was operative to trip a circuit breaker and thus identify whether a short circuit, an overload or a ground fault condition existed, the present invention incorporates a plurality of electronic switches electrically connected in parallel with each other across an energization source. Included in each parallel electronic switch path is an electromagnetic indicator or target. Each electronic switch is triggered from a different one of the above-mentioned trip circuits, and when triggered, completes an energization circuit for its series-connected target. Thus, to determine which of the trip functions was operative, one need only observe which of the targets has been actuated.

The triggering circuit for each target electronic switch is connected in common with the triggering circuit of an electronic switch connected in series with the trip coil across an energization source. Thus, the trip signal issuing from any one of the trip circuits is applied to both the appropriate target electronic switch and also to the trip coil electronic switch. Inasmuch as the appropriate target and the trip solenoid coil are energized independently, plus the fact that the appropriate target electronic switch and the trip solenoid electronic switch are triggered in common, defects in the target circuits cannot jeopardize the energization of the trip solenoid in initiating a trip function.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which the sole FIGURE is a circuit schematic diagram, partially in block form, illustrating an embodiment of the present invention.

DETAILED DESCRIPTION

Referring now to the drawing, a multi-function solid state trip unit of the present invention is illustrated as being implemented to protect a three phase electrical power distribution circuit consisting of line conductors L1, L2 and L3, wherein the trip unit operates to energize a trip coil TC acting to initiate separation of ganged circuit breaker contacts 12 in response to an abnormal current condition existing in any one of the three line conductors. The levels of current flowing in each of the line conductors are separately monitored by individual current transformer CT1, CT2 and CT3. The secondary current outputs of these transformers are supplied to a power supply circuit 14, an overcurrent sensing circuit 16, and a ground fault sensing circuit 18. The input circuit configuration, as well as the power supply, overcurrent sensing and ground fault sensing circuits may be constructed in the manner disclosed in Willard U.S. Pat. No. 3,803,455. As illustrated in this patent, the power supply includes full wave bridge rectifying networks for developing regulated DC supply voltage to power the overcurrent sensing and ground fault sensing circuits, as well as the trip coil. The overcurrent sensing circuit includes cascaded current transformers and a logic network for developing an output signal whose magnitude is proportional to the highest level of current flowing in any one of the line conductors. The ground fault sensing circuit includes a zero sequence transformer capable of developing an output signal proportional in magnitude to any imbalance in the currents flowing in the line conductors as would represent ground leakage current returning to the source through an unintended ground path.

The signal on output lead 16a of overcurrent sensing circuit 16 is supplied in parallel to an instantaneous trip circuit 20 and a delayed trip circuit 22. In practice, this delayed trip circuit may comprise separate long time and short time delay trip circuits. The signal output from ground fault sensing circuit 18 is supplied over lead 18a to a ground fault trip circuit 24. The trip circuits 20 and 22 become selectively active depending upon the severity of the overcurrent condition sensed by overcurrent sensing circuit 16. By way of example, if the current in any one of the line conductors exceeds 10 times rated current, signifying a short circuit condition, the instantaneous trip circuit 20 acts forthwith to initiate a trip function. On the other hand, if the line current in any one of the line conductors exceeds rated current, but is less than 10 times rated current, the delayed trip circuit 22 becomes operative in response to this overload condition by imposing a time delay whose duration is inversely proportional to the degree of overcurrent. Thus, if the line current is only slightly in excess of rated current, the circuit 22 would impose a long time delay of minutes in duration before initiating a trip function.

Finally, upon the detection of a current imbalance, signifying a ground fault, ground fault trip circuit 24 is activated by an output signal on lead 18a from ground fault sensing circuit 18 to impose an appropriate delay prior to initiating a ground fault trip function.

While not shown in the drawing, it will be understood that the power supply 14 is connected to power the various circuits 16, 18, 20, 22 and 24.

In the solid state or static trip disclosed in the above-noted U.S. Pat. No. 3,803,455, the outputs for the various trip circuits are supplied in common to a single electronic switch, typically in the form of a silicon controlled rectifier or, generically, a thyristor, connected in the energization circuit for the trip coil. Thus, for one of the trip circuits to initiate a trip function, its output trip signal triggers the common thyristor, converting it to its highly conductive state, and current is drawn from the power supply through the trip coil pursuant to effectuating the trip function resulting in separation of the circuit breaker contacts.

In accordance with the present invention, the trip signals from the various trip circuits are separately applied to the triggering or gate circuits of different thyristors and are also commonly applied to the triggering or gate circuit of an additional thyristor connected in the energization circuit for the trip coil TC. Thus as seen in the drawing, the trip signal issuing from the instantaneous trip circuit 20 on output lead 20a is supplied to the gate of a thyristor SCRL, the trip signal issuing from the delayed trip circuit 22 on output lead 22a is applied to the gate of thyristor SCR2, and the trip signal issuing from ground fault trip circuit 24 on lead 24a is applied to the gate of thyristor SCR3. The cathodes of these three thyristors are connected directly to a common bus 26, as are their gates through separate resistors R1, R2 and R3. The anodes of these three thyristors are connected to a common bus 28 through separate electromagnetic targets 30, 32 and 34. These targets may be constructed in the manner disclosed in U.S. Pat. No. 3,893,052. Bus 28 is connected through a current limiting resistor R4 and lead 14a to power supply 14. The upper end of trip coil TC is connected by lead 36 to the junction between resistor R4 and power supply output lead 14a, while its lower end is connected through a thyristor SCR4 to a ground bus 38. A capacitor C1 is connected across thyristor SCR4 to limit voltage rise from anode to cathode, and thus prevent spurious triggering. Bus 26 is connected to the gate of thyristor SCR4 and also to ground bus 38 by a resistor R5. A pair of series connected diodes D1, connected between bus 26 and ground bus 30, serves to clamp the voltage on bus 26 to approximately 2volts maximum. A capacitor C2 is connected from the junction of resistor R4 and power supply output lead 14a to ground bus 38. This capacitor is preferably a polarized capacitor, and thus is shunted by a diode D2 poled to protect against reverse voltages.

From the foregoing circuit description, it is seen that should the instantaneous trip circuit 20, for example, issue a trip signal in response to the presence of a short circuit condition, the trip signal current flows through the divider network consisting of resistors R1 and R5, such as to develop concurrent triggering voltages for both thyristors SCR1 and SCR4. Thyristor SCR1 turns on, and capacitor C2 previously charged from power supply 14, discharges through current limiting resistor R4, target 30, bus 26 and the parallel combination of diodes D1 and resistor R5. Target 30 is thus actuated to indicate an instantaneous trip function. At the same time, the trip signal voltage developed across resistor R5 provides triggering voltage for thyristor SCR4, which turns on to draw energizing current through the trip coil TC from the power supply 14 via leads 14a and 36. The trip coil is thus actuated to effectuate tripping of the circuit breaker and ultimate separation of the breaker contacts to clear the short circuit condtion. To provide a measure of redundancy in triggering the trip coil thyristor SCR4, it will be noted that the target energizing current derived from capacitor C2, in flowing through diodes D1 and resistor R5, also develops triggering voltage for the trip coil thyristor which supplements the trip signal triggering voltage. Thus, thyristor SCR4 receives an extra hard triggering voltage by virtue of the present invention, thus ensuring its conversion to a highly conductive state.

Also to be noted is that the integrity of the trip coil energization circuit and the triggering circuit for thyristor SCR4 is not prejudiced by any defects in the target circuits. That is, should a target loose continuity, all that is lost is the redundancy of the supplemental triggering voltage for thyristor SCR4 provided by the target energizing current. The original triggering voltage developed across resistor R5 from a trip signal issuing from any one of the trip circuits 20, 22 and 24 will nevertheless be present to drive thyristor SCR4 into conduction.

As an additional feature of the invention, bus 26 is brought up to a terminal 26a to which an accessory trip signal may be applied from, for example, a remote location for the purpose of triggering thyristor SCR4 to shunt trip the circuit breaker.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A solid state trip unit for an electric circuit breaker having circuit interrupting contacts whose separation is initiated by energization of a trip coil, said trip unit comprising, in combination:
   A. a power supply having one side electrically connected to one terminal of the trip coil;
   B. means monitoring the current flowing in an electric distribution circuit;
   C. a first trip circuit electrically connected to said current monitoring means and operative to issue on a first output lead a first trip signal in response to a first abnormal condition;
   D. a second trip circuit electrically connected to said current monitoring means and operative to issue on a second output lead, a second trip signal in response to a second abnormal condition;
   E. first, second and third electrical busses,
      1. said first bus electrically connected to said one side of said power supply, and
      2. said second bus electrically connected to the other side of said power supply;
   F. a first target circuit including a first target and a first thyristor connected in series between said first and third busses, said first thyristor having a gate terminal continuously electrically connected to said first output lead;
   G. a second target circuit including a second target and a second thyristor connected in series between said first and third busses, said second thyristor having a gate terminal continuously electrically connected to said second output lead;
   H. a third thyristor electrically connecting the other terminal of the trip coil to said second bus, said third thyristor having a gate terminal continuously electrically connected to said third bus;
   I. a first triggering circuit consisting of a first resistor electrically connected between the junction of said first output lead and said first thyristor gate terminal and said third bus, said first trip signal directly developing across said first resistor a gate triggering voltage rendering said first electronic switch conductor for energization of said first target;
   J. a second triggering circuit consisting of a second resistor continuously electrically connected between the junction of said second output lead and said second thyristor gate terminal and said third bus, said second trip signal directly developing across said second resistor a gate triggering voltage rendering said second thyristor conductor for energization of said second target;
   K. a third triggering circuit consisting of a third resistor electrically connected between the junction of said third bus and third thyristor gate terminal and said second bus, either of said first or second trip signals directly developing across said third resistor a gate triggering voltage rendering said third thyristor conductor for energization of the trip coil from said power supply; and
   L. an externally accessible accessory trip signal input terminal electrically connected to said third bus, the application of an accessory trip signal to said input terminal serving to develop a gate triggering voltage exclusively across said third resistor, thereby rendering said third thyristor conductive for energization of the trip coil independently of said first and second triggering circuits and said first and second trip signal output leads.

* * * * *